(12) United States Patent
Tamaru

(10) Patent No.: US 7,133,177 B2
(45) Date of Patent: Nov. 7, 2006

(54) OPTICAL SCANNER AND IMAGE FORMING APPARATUS

(75) Inventor: Yasuo Tamaru, Nagoya (JP)

(73) Assignee: Brother Kagyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 11/362,181

(22) Filed: Feb. 27, 2006

(65) Prior Publication Data
US 2006/0193025 A1    Aug. 31, 2006

(30) Foreign Application Priority Data
Feb. 28, 2005    (JP) .............................. 2005-055102

(51) Int. Cl.
G02B 26/08    (2006.01)
(52) U.S. Cl. ...................... 359/204; 347/259
(58) Field of Classification Search ...................... None
See application file for complete search history.

(56) References Cited

U.S. PATENT DOCUMENTS

| 5,850,306 A | 12/1998 | Fukutome et al. |
| 6,717,704 B1 | 4/2004 | Nakai |
| 6,856,439 B1 | 2/2005 | Inagaki |
| 2004/0174581 A1 * | 9/2004 | Iizuka et al. ................. 359/204 |

FOREIGN PATENT DOCUMENTS

| JP | 5-27187 | 2/1993 |
| JP | 9-179046 | 7/1997 |
| JP | 2003-75751 | 3/2003 |
| JP | 2003-270567 | 9/2003 |
| JP | 2003-295079 | 10/2003 |
| JP | 2003-302589 | 10/2003 |
| JP | 2004-70190 | 3/2004 |

* cited by examiner

Primary Examiner—James Phan
(74) Attorney, Agent, or Firm—Banner & Witcoff Ltd

(57) ABSTRACT

An optical scanner includes a scanning unit having a reflecting surface that reflects a laser beam and scans the laser beam in a primary scanning direction, a laser beam radiation unit that radiates laser beams to the reflecting surface from directions at predetermined angles to a reference plane, which is orthogonal to the reflecting surface and extending along the primary scanning direction, and optical members provided on optical paths of the laser beams after reflections. The laser beam radiation unit radiates the laser beams, in such a manner that, an angle on a plane orthogonal to the reference plane between a first and second optical paths is larger than an angle between the first and third optical paths, the second and third optical paths being adjacent to one side and other side of the first optical path, respectively. The optical member on the second optical path is nearer the reflecting surface than the third optical path.

7 Claims, 4 Drawing Sheets

OPTICAL SCANNER AND IMAGE FORMING APPARATUS

CROSS REFERENCE TO RELATED APPLICATION

This application claims priority from Japanese Patent Application No. 2005-055102, filed Feb. 28, 2005, the contents of which are hereby incorporated by reference into the present application.

TECHNICAL FIELD

The present invention relates to an image forming apparatus, such as a laser printer, and an optical scanner provided in the image forming apparatus.

BACKGROUND

A tandem type color laser printer in which four photosensitive drums for yellow, magenta, cyan and black are laterally arranged is known as a color laser printer of an electrophotographic system. In this tandem type color laser printer, electrostatic latent images are written on the photosensitive drums, which are then developed with toners of the various colors. As a result, toner images of various colors are formed substantially at once on the photosensitive drums, and these toner images are transferred in a color-superposed state on a sheet material passing the photosensitive drums in order, so that color images can be formed at substantially the same speed as a monochromatic image obtained by a monochromatic laser printer.

In such a tandem type color laser printer, it is necessary that latent images corresponding to various colors with respect to the four photosensitive drums be formed. However, when four scanners are provided correspondingly to the four photosensitive drums, it becomes unavoidable that the cost of the apparatus and the dimensions thereof increase. Therefore, a structure for forming electrostatic latent images by putting four laser beams corresponding to the various colors into the same reflective surface of a polygon mirror, carrying out the polarization scanning in the main scanning direction while separating the optical path toward the auxiliary scanning direction, and thereby forming electrostatic latent images corresponding to the various colors on the four photosensitive drums by one optical scanner. (Refer, e.g. JP-A-2003-295079.)

However, in the structure in which four laser beams are put in the same reflecting surface of the polygon mirror, the incident positions of the various laser beams on the same reflecting surface become close to one another, and a distance between the optical paths of the various beams reflected on the same reflecting surface become narrow unless the dimensions of the apparatus are greatly enlarged. Therefore, the optical members, such as a reflecting mirror provided in the portion of the optical path of the reflected laser beam have to be placed in predetermined positions with a high accuracy so as to avoid the interference (for example, reflection and cutoff) of the laser beam with the optical paths through which the laser beams pass. As a result, extremely much labor and much time are needed for the arrangement of the members in predetermined positions with a high accuracy.

Therefore, an object of the present invention is to provide an optical scanner capable of reducing the labor and time needed to arrange the optical members without enlarging the dimensions of the apparatus, and an image forming apparatus provided with the same.

SUMMARY

According to an illustrative example, an optical scanner includes a scanning unit having a reflecting surface that reflects a laser beam on the reflecting surface and scans the laser beam in a primary scanning direction, a laser beam radiation unit that radiates a plurality of laser beams to the reflecting surface from directions at predetermined angles to a reference plane respectively, the reference plane being orthogonal to the reflecting surface and extending along the primary scanning direction, and optical members respectively provided on optical paths of the plurality of laser beams after reflections on the reflecting surface. The laser beam radiation unit radiates the plurality of laser beams to the reflecting surface, in such a manner that, among the optical paths of the plurality of laser beams after the reflections on the reflecting surface, an angle on a plane orthogonal to the reference plane between a first optical path and a second optical path is larger than an angle on the plane orthogonal to the reference plane between the first optical path and a third optical path, the second optical path being adjacent to one side of the first optical path, and the third optical path being adjacent to an other side of the first optical path. The optical member on the second optical path is disposed in a position nearer the reflecting surface than the optical member on the third optical path.

DETAILED DESCRIPTION OF ILLUSTRATIVE EXAMPLES

Figure 1:
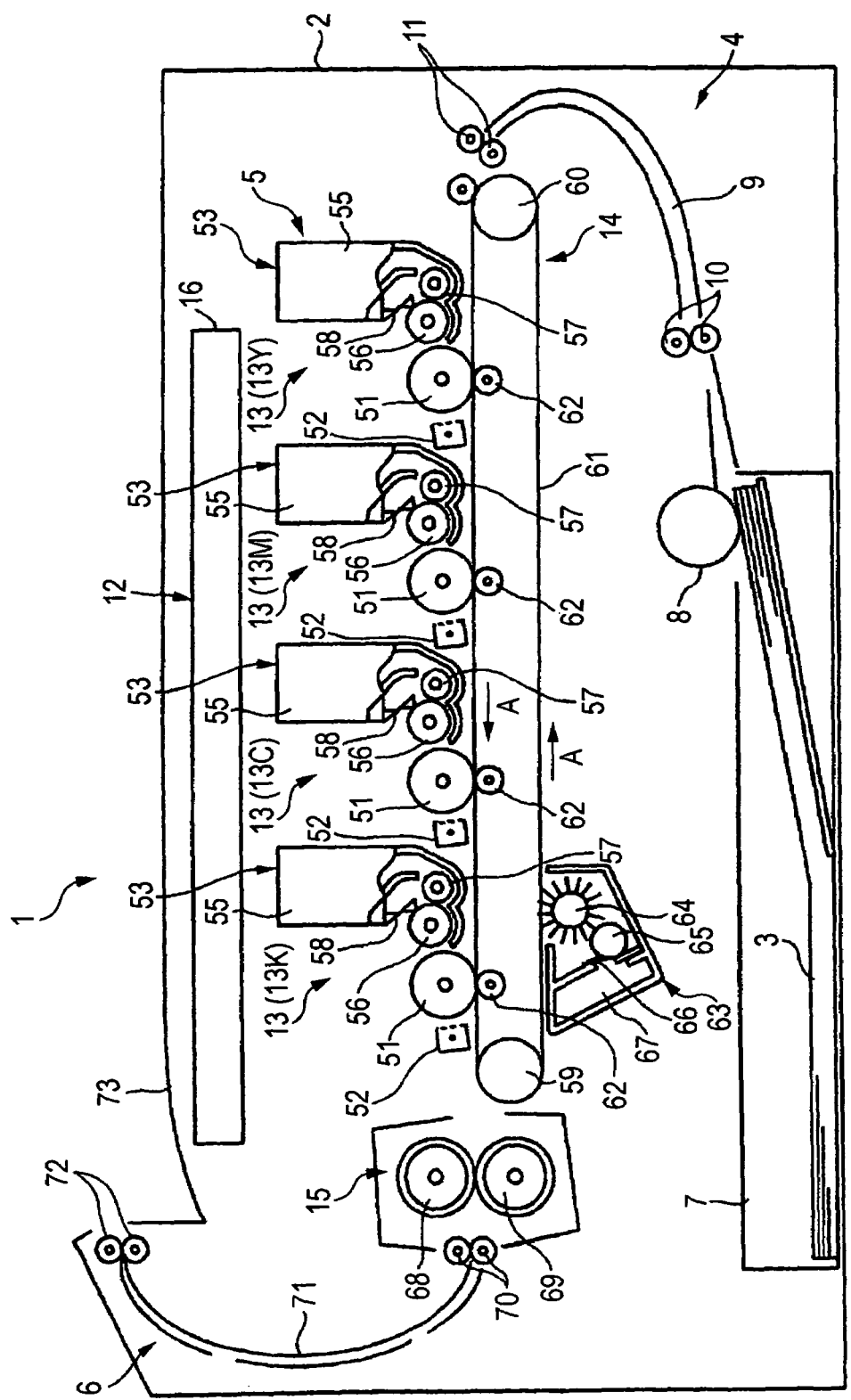
FIG. 1 is a sectioned side view (longitudinally sectioned longitudinal side view) showing a mode of an illustrative example of a color laser printer as an image forming apparatus according to the present invention.

According to an example structure, the angle formed between the first optical path and second optical path is larger than that formed between the first optical path and third optical path. Therefore, between the first optical path and second optical path, a distance large enough to provide optical members onto the second optical path in position near the reflective surfaces of the scanning unit can be secured compared with that between the first optical path and third optical path. Accordingly, the optical members on the third optical path can be provided in relatively far positions with respect to the reflective surfaces of the scanning unit, and the optical members on the second optical path in relatively near positions. This can prevent these optical members from interfering with the laser beam passing the first optical path even when a small error occurs in the arrangement of the optical members. This enables the accuracy which the arrangement of each optical member requires to be lowered without increasing the dimensions of the apparatus. As a result, the labor and time needed to arrange the optical members can be reduced.

According to an illustrative example, the laser beam radiation unit radiates the plurality of laser beams to the reflecting surface, in such a manner that, the second laser beam is reflected at a position which is separated by a predetermined distance on the plane is orthogonal to the reference plane toward one side with respect to a reflection position of a first laser beam on the reflecting surface, and a third laser beam is reflected at a position separated by a distance smaller than the predetermined distance on the plane orthogonal to the reference plane toward an other side with respect to the reflection position of the first laser beam, and the optical member on an optical path of the second laser beam is disposed in a position nearer the reflecting surface than the optical member on an optical path of the third laser beam.

According to an example structure, the distance between the first laser beam reflecting positions and second laser beam reflecting positions on the reflecting surfaces of the scanning unit is larger than that between the first laser beam reflecting position and third laser beam reflecting positions thereon. Therefore, when the angle formed between the optical path on which the first laser beam was reflected and optical path on which the third laser beam was reflected is not smaller than that formed between the optical path on which the first laser beam was reflected and optical path on which the second laser beam was reflected, a distance large enough to arrange optical members on the optical path on which the second laser beam was reflected can be secured. Accordingly, when the optical members on the optical path on which the third laser beam was reflected are provided in a relatively far position with respect to the reflecting surface of the scanning unit with those on the optical path on which the second laser beam was reflected provided in a relatively near position with respect thereto, the interfering of the optical members with the laser beam passing the first optical path can be prevented even though a small error occurs in the arrangement of these optical members. As a result, the labor and time needed to arrange the optical members can further be reduced.

The first optical path may be an optical path which the first laser beam reflected on the reflecting surface of the scanning unit passes. The second optical path may be an optical path which the second laser beam reflected on the reflecting surface of the scanning unit passes. The third optical path is more preferably an optical path which the third laser beam reflected on the reflecting surface of the scanning unit passes. In this structure, a larger distance can be secured between the first optical path and a second optical path, and the accuracy which the arrangement of the optical members on the second optical path requires can further be reduced.

According to an illustrative aspect, the laser beam radiation unit radiates at least one laser beam to the reflecting surface from a side of the reference plane which is opposite to a side from which an other laser beam is radiated to the reflecting surface.

According to an example structure, a margin can be provided in the intervals of the radiation of the laser beams compared with the intervals of the radiation of the laser beams in the case where all laser beams are applied to the reflecting surface of the scanning unit from the same side with respect to the reference plane, so that the degree of freedom of the arrangement of the members provided on the laser beam radiation unit can be increased.

According to an illustrative aspect, the laser beam radiation unit radiates the plurality of laser beams to the reflecting surface, in such a manner that, an angle on the plane orthogonal to the reference plane between a laser beam separated the most toward one side with respect to the reference plane and the reference plane is the same as an angle on the plane orthogonal to the reference plane between a laser beam separated the most toward an other side with respect to the reference plane and the reference plane.

According to an example structure, an angle at which a laser beam farthest away from the reference plane to one side in the direction crossing the reference plane at right angles thereto enters the reflecting surface of the scanning unit and an angle at which a laser beam farthest away from the reference plane to the other side enters the reflecting surface can be set equal to each other. Therefore, these laser beams can be subjected to scanning operations with the same accuracy by the scanning unit.

According to an illustrative aspect, the optical member on the first optical path is a reflecting mirror that reflects the first optical path toward one side of the reference plane, the optical member on the second optical path is a reflecting mirror that reflects the second optical path toward one side of the reference plane, and the optical member on the third optical path is a reflecting mirror that reflects the third optical path toward one side of the reference plane.

According to an example structure, the laser beams passing the first optical path, second optical path and third optical path are reflected to the same side with respect to the reference plane. Therefore, the other optical members to be provided on each reflected optical path can be arranged in a concentrated manner. As a result, the apparatus can be downsized.

According to an illustrative aspect, an image forming apparatus includes the optical scanner an example structure, a photosensitive body or a plurality of photosensitive bodies on which an electrostatic latent image is formed by scanning a laser beam by the optical scanner, and a developing unit or a plurality of developing units adapted to develop with a developing agent the electrostatic latent image formed on the photosensitive body.

According to an example structure, the optical scanning apparatus is provided, so that the labor and time needed to manufacture the image forming apparatus can be reduced.

According to an illustrative aspect, the photosensitive bodies are included plurally, the developing units are included plurally correspondingly to the respective photosensitive bodies, and the electrostatic latent images formed on the photosensitive bodies are developed with different colors of developing agents.

According to an example structure, developing agents of mutually different colors are supplied to a plurality of photosensitive drums. Therefore, when the developed images are transferred in order in a color superposed state on a recording medium, such as paper, a color image can be formed at substantially the same speed as a monochromatic image.

According to an illustrative aspect, the labor and time needed to provide optical members can be reduced without increasing the dimensions of the apparatus.

According to an illustrative aspect, the degree of freedom of the arrangement of the members provided on the laser beam radiation unit can be increased.

According to an illustrative aspect, the laser beam farthest away from the reference plane toward one side thereof and the laser beam farthest away from the reference plane toward the other side thereof can be subjected to a scanning operation with the same accuracy by the scanning unit.

According to an illustrative aspect, the apparatus can be downsized.

According to an illustrative aspect, the labor and time needed to manufacture the image forming apparatus can be reduced.

According to an illustrative aspect, the developing agent image formed on each photosensitive drum can be transferred in order in a color superposed state on a recording medium, such as paper at substantially the same speed as a monochromatic image.

<General Constitution of the Color Laser Printer>

FIG. 1 is a side view in section showing a mode of illustrative example of a color laser printer as the image forming apparatus according to the present invention.

This color laser printer 1 is a laterally lined tandem type color laser printer having a plurality of processors 13 parallel-arranged in the horizontal direction. This color laser printer is provided in a box type body casing 2 thereof with a paper feed section 4, image formation sections 5 adapted to form images on the paper fed, and a paper discharge section 6 adapted to discharge the paper 3 on which images are formed.

<Constitution of the Paper Feed Section>

The paper feed section 4 has a paper cassette 7 provided in a bottom portion of the interior of the body casing 2, a paper feed roller 8 provided at a front upper side (in the following description, the right side in FIG. 1 will hereinafter be referred to as a front side, and the left side therein the rear side) of the paper feed cassette 7, a paper feed roller 8 provided at the front upper side of the paper feed cassette 7, a feed paper path 9 provided at the front upper side of the paper feed roller 8, a pair of transfer rollers 10 provided in an intermediate portion of the paper feed path 9, and a pair of resist rollers 11 provided at the downstream end portion of the paper feed path 9.

In the paper cassette 7, paper 3 is stacked, and the paper 3 in the highest position therein is sent out into the paper feed path 9 by the rotation of the paper feed roller 8.

The paper feed path 9 is adjacent at an upstream end portion thereof to the paper feed roller 8 so that the paper 3 is fed forward, and at a downstream end portion thereof adjacent on the upper side thereof to a transfer belt 61 which will be described later. Namely, the paper feed path 9 is formed as a substantially U-shaped paper transfer path from which the paper 3 is discharged rearward.

The paper 3 sent out into the paper feed path 9 is transferred in the paper feed path 9 by the transfer rollers, and the transfer direction is reversed. The paper 3 then resists the resist rollers 11, and is then discharged rearward by the resist rollers 11.

<Constitution of the Image Formation Section>

The image formation section 5 includes a scanner unit 12 as an optical scanner, processor 13, a transfer section 14 and a fixing section 15.

<Constitution of the scanner unit>

The scanner unit 12 is provided in an upper portion of the interior of the body casing 2 so as to extend over a plurality of processors 13 which will be described later.

Figure 2:
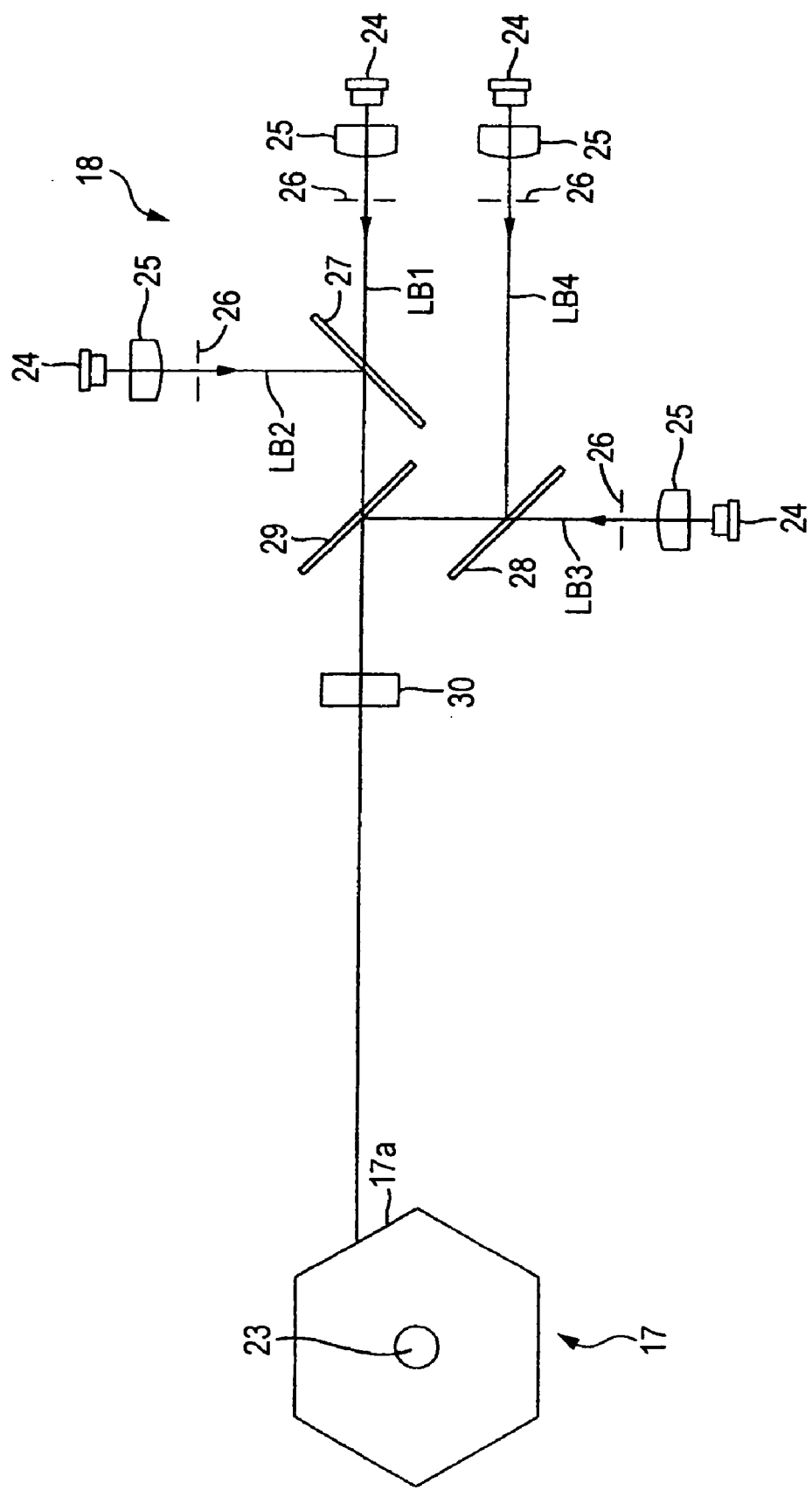
FIG. 2 is a side view showing the optical system of the laser radiation optical section in a scanner unit in the color laser printer shown in FIG. 1.
Figure 3:
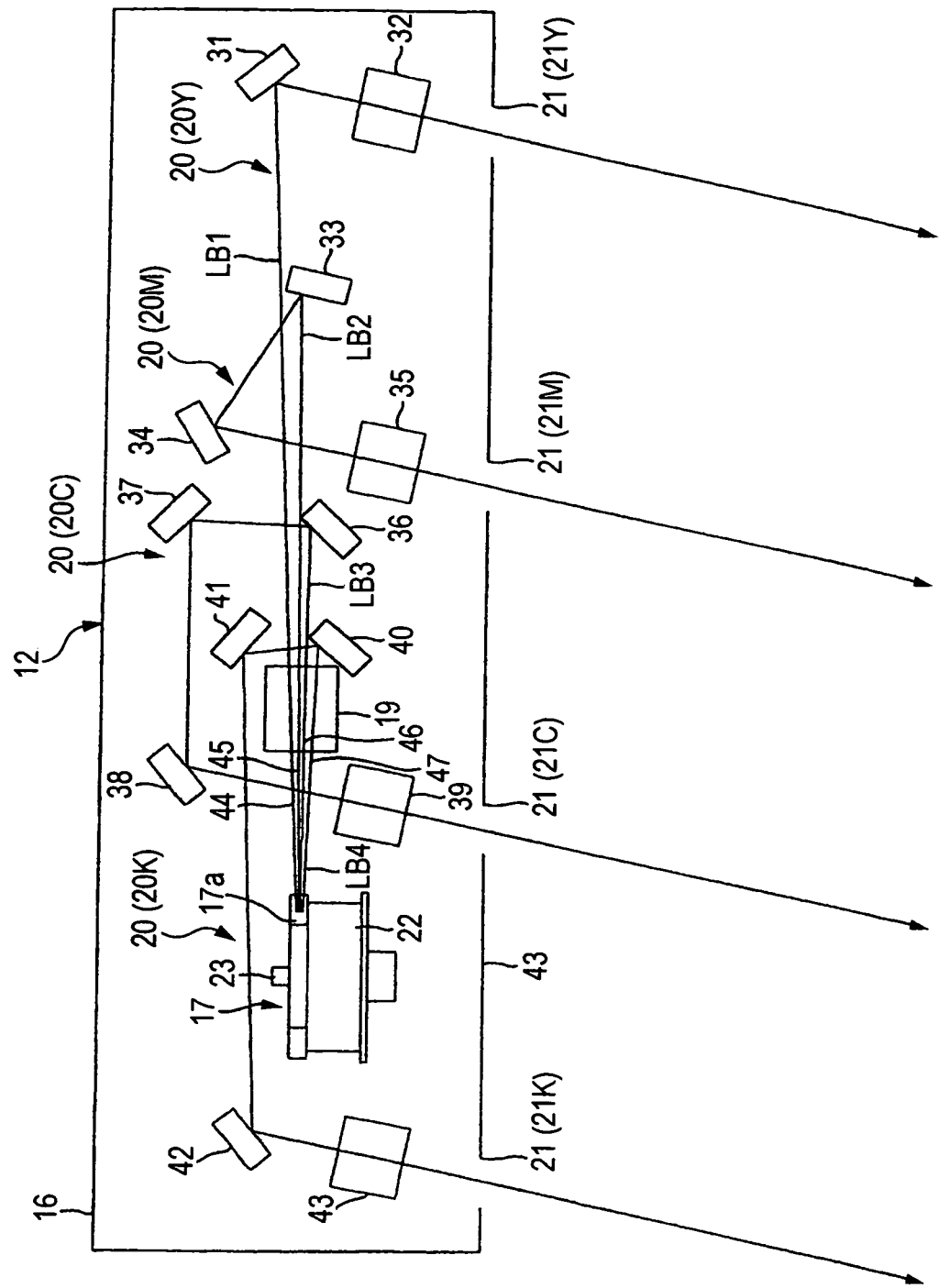
FIG. 3 is a side view showing the optical system in the laser beam outputting optical section in a scanner unit of the color laser printer shown in FIG. 1.

FIG. 2 is a plan view of the constitution of a principal portion of the scanner unit 12 taken from the above, and FIG. 2 a side view in section in which the scanner unit 12 is taken from a side thereof. As shown in FIGS. 2 and 3, this scanner unit 12 includes a scanner casing 16, a polygon mirror 17 as a scanning unit provided in the scanner casing 16, a laser beam radiation optical section 18 as a laser beam radiation unit for applying laser beams to the polygon mirror 17, and a laser beam outputting optical section 20 for outputting laser beams LB which pass a fθ lens 19 and a fθ lens 19, which convert laser beams LB1, LB2, LB3, LB4 (which will hereinafter be referred to simply as "laser beam LB" when these are generically called) polarized and subjected to a scanning operation by the polygon mirror 17 into beams of equal velocity on image surfaces.

The scanner casing 16 has a box type shape as shown in FIG. 3, and bottom walls 43 thereof are provided with output windows 21 corresponding to various colors. The output windows 21 are provided in a spaced manner in the longitudinally different positions from the front side to the rear side correspondingly to each color in order as a yellow output window 21Y, a magenta output window 21M, a cyan output window 21C and a black output window 21K.

One polygon mirror 17 is provided with respect to four laser beam emitting portions 24 which will be described later. This polygon mirror 17 is formed to a polyhedron (for example, a hexahedron) having a plurality of reflecting surfaces 17a, and being provided rotatably around a rotary shaft 23 inserted into the center of a motor board 22. The motor board 22 houses therein a scanner motor (not shown), by the power of which the polygon mirror 17 is rotated at a high speed.

As shown in FIG. 2, the laser beam radiation optical section 18 has four sets of laser beam emitting portions 24, collimator lenses 25 and slit plates 26 corresponding to various colors, three reflecting mirrors 27, 28, 29, and one cylindrical lens 30.

Each laser beam emitting portion 24 is formed of, for example, a semiconductor laser. The two laser beam emitting portions 24 are opposed in plan to the polygon mirror 17, and disposed in a mutually spaced manner in the direction orthogonal to the polygon mirror-opposed direction. The laser beam emitting portions output laser beams LB1, LB4 in the same direction (direction opposed to the polygon mirror 17) so that the laser beams LB1, LB4 become parallel with each other. The other two laser beam emitting portions 24 are disposed in plan so that the laser beams LB2, LB3 cross the laser beams LB1, LB4 orthogonally and shift from each other in the output direction of the laser beams LB1, LB4 and in the mutually opposed direction.

Each collimator lens 25 is provided on the downstream side and opposing to each laser emitting portion 24 in an output direction of the laser beam LB from the laser beam emitting portion 24.

Each slit plate 26 is provided on the downstream side and opposing to each collimator lens in the output direction of the laser beam LB from the laser beam emitting portion 24. Each slit plate 26 is provided with a slit for restricting the cross-sectional shape passing each laser beam LB therethrough and being orthogonal to the passing direction.

The laser beam LB emitted from each laser beam emitting portion 24 is converted into a parallel beam by each collimator lens 25. Each laser beam LB then passes through the slit of each slit plate 26, and the cross-sectional shape thereof orthogonal to the laser beam passing direction is limited. Accordingly, the occurrence of stray light of the laser beam LB emitted from each laser beam emitting portion 24 can be prevented.

The reflecting mirror 27 is provided at a position on the optical path of the laser beam LB in which the laser beam LB1 and laser beam LB2 cross each other in plan so that the laser beam LB2 enters the reflecting surface thereof at an angle of 45°. On this reflecting mirror 27, the laser beam LB2 is reflected at 90° and refracts, while the laser beam LB1 passes below the reflecting mirror 27. The optical paths of these laser beams LB1, LB2 are synthesized so that the optical paths of these laser beams LB1, LB2 agree with each other in plan vertically (direction orthogonal to a reference plane F which will be described later) spaced.

The reflecting mirror 28 is provided at a position on the optical path of the laser beam LB4 in which the laser beam LB3 and laser beam LB4 cross each other in plan so that the laser beam LB4 enters the reflecting surface thereof at an angle of 45°. On this reflecting mirror 28, the laser beam LB4 is reflected at 90° and refracts, while the laser beam LB3 passes below the reflecting mirror 28. The optical paths of these laser beams LB3, LB4 are synthesized so that these optical paths agree with other vertically spaced in plan.

The reflecting mirror 29 is provided at a position on the optical paths of the laser beams LB3, LB4 passing through and reflected on the reflecting mirror 28 in which the laser beams LB1, LB2 and laser beams LB3, LB4 cross each other in plan so that the laser beams LB3, LB4 enter the reflecting surface thereof at an angle of 45°. On this reflecting mirror 29, the laser beams LB3, LB4 are reflected at 90° and refracts. In the meantime, the laser beams LB1, LB2 pass below the reflecting mirror 28. The optical paths of the laser beams LB are thereby synthesized so that the optical paths of the laser beams LB are vertically spaced in parallel with each other, and agree with each other in plan.

The cylindrical lens 30 is a resin lens formed out of a resin material by the injection molding, and provided at a position in the direction in which the laser beams LB pass which is on a downstream side of the reflecting mirror 29 and on the upstream side of the polygon mirror 17.

The laser beams LB passing through or reflected on the reflecting mirror 29 permeate the cylindrical lens 30. At this time, the laser beams LB refract so as to converge at the same position (point Q, shown in FIG. 4, which will be described later) in the vertical direction, and enter the same reflecting surface 17a of the polygon mirror 17.

Figure 4:
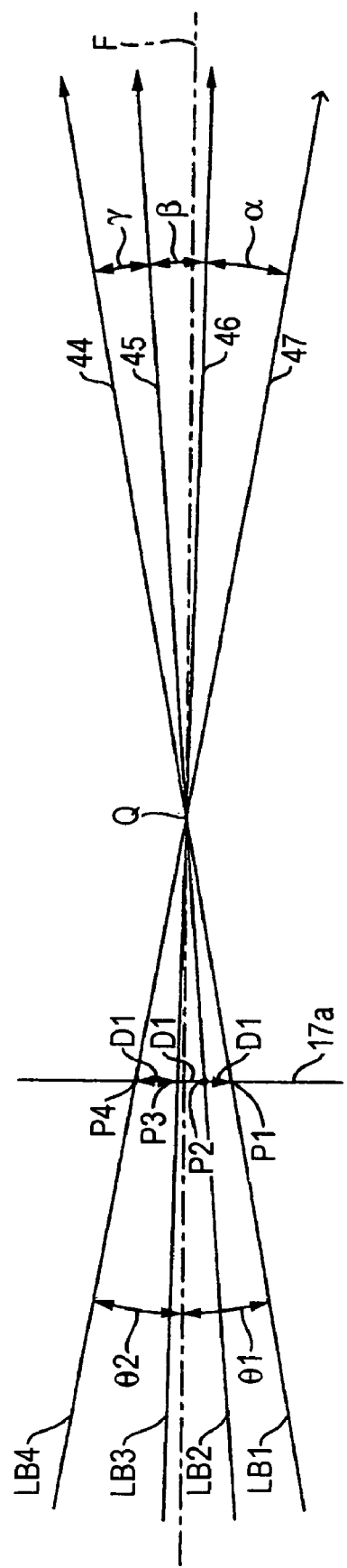
FIG. 4 is a schematic diagram showing optical paths of the laser beams entering and reflecting on the reflecting surface of the polygon mirror in the scanner unit in the color laser printer shown in FIG. 1.

FIG. 4 is a schematic diagram of the optical paths of the laser beams LB entering the reflecting surface 17a and the laser beams LB reflected thereon. Referring to the drawing, the left side of the reflecting surface 17a shows the optical path (in which the laser beam LB enters the reflecting surface 17a) before reflection, and the right side of the reflecting surface shows the optical path after reflection.

As shown in FIG. 4, the laser beams LB1, LB2 are put from the lower side of the reference plane F into the reflecting surface 17a, and the laser beams LB3, LB4 from the upper side of the reference plane F into the reflecting surface 17a. According to a design of the cylindrical lens 30, the laser beams LB enter the reflecting surface 17a making a relation with the reflecting surface 17a which will be described in 1 to 3 below.

1. The laser beam LB1 farthest away downward from the reference plane F and the laser beam LB4 farthest away upward from the reference plane F enter the reflecting surface 17a in the directions symmetric with each other with respect to the reference plane F, and an angle θ1 formed between the laser beam LB1 and the reference plane F is the same as θ2 formed between the laser beam LB4 and the reference plane F.

2. Just after reflection of each laser beam LB (before reflection on the reflecting mirrors 31, 33, 36, 40) on the reflecting surface 17a, an angle α formed between the optical path 47 as the second optical path of the laser beam LB4 and the optical path 46 as the first optical path of the laser beam LB3 becomes 2°, an angle β formed between the optical path 46 of the laser beam LB3 and the optical path 45 as the third optical path of the laser beam LB2 becomes 1.50(β<α), and an angle γ formed between the optical path 45 of the laser beam LB2 and the optical 44 of the laser beam LB1 becomes 1.5°(γ<β).

3. On the reflecting surface 17a, an incident position (reflecting position) P4 of the laser beam LB4 as the second laser beam and an incident position (reflecting position) P3 of the laser beam LB3 as the first laser beam are separated by a distance D1 on a plane orthogonal to the reference plane F, an incident position P3 of the laser beam LB3 and an incident position P2 of the laser beam LB2 as the third laser beam being separated by a distance D2 (D2<D1) smaller than the distance D1 on the plane orthogonal to the reference plane F, the incident position P2 of the laser beam LB2 and an incident position (reflecting position) P1 of the laser beam LB1 being separated by a distance D3 (D3=D2) equal to the distance D2 on the plane orthogonal to the reference plane F.

Each laser beam LB is thus inputted into the reflecting surface 17a from the direction at a predetermined angle to the reference plane F which is orthogonal to the reflecting surface 17a of the polygon mirror 17, and which extends substantially horizontally. On the polygon mirror 17, the laser beam LB entering the same reflecting surface 17a is reflected by the high speed rotation thereof, and is subjected to scan in a main scanning direction.

Referring to FIG. 3, the fθ lens 19 converts four laser beams LB, which are inputted from the laser radiation optical portion 18 into the polygon mirror 17 and subjected to scan in the main scanning direction, into parallel beams of an equal velocity.

The laser beam outputting portions 20 are provided correspondingly to various colors. Namely, the laser beam outputting portions 20 include four portions corresponding to each color, i.e. a yellow optical portion 20Y, a magenta optical portion 20M, a cyan optical portion 20C and a black optical portion 20K.

The yellow optical portion 20Y is provided with a reflecting mirror 31 for reflecting the laser beam LB4 thereon, and a toroidal lens 32 adapted to converge the laser beam LB4 reflected on the reflecting mirror 31 in the auxiliary scanning direction (direction orthogonal to the main scanning direction).

The laser beam LB4 passing through the fθ lens 19 is first reflected on the reflected in the diagonally rearward and downward direction on the reflecting mirror 31 in the yellow optical portion 20Y, and passes through a toroidal lens 32, the resultant laser beam LB4 being discharged from the yellow output window 21Y.

The magenta optical portion 20M is provided with two reflecting mirrors 33, 34 for reflecting the laser beam LB3 thereon, and toroidal lens 35 adapted to converge the laser beam LB3 reflected on the reflecting mirrors 33, 34, in the auxiliary scanning direction.

The laser beam LB3 passing through the fθ lens 19 is first reflected in the diagonally rearward and upward direction on the reflecting mirror 33 as an optical member in the magenta optical portion 20M, and then reflected in the diagonally rearward and downward direction on the reflecting mirror 34. The laser beam LB3 then passes through the toroidal lens 35, and is discharged from the magenta output window 21M.

The cyan optical portion 20C is provided with three reflecting mirrors 36, 37, 38 for reflecting the laser beam LB2, and a toroidal lens 39 for converging the laser beam LB2 reflected on the reflecting mirrors 36, 37, 38 in the auxiliary scanning direction.

The laser beam LB2 passing through fθ lens 19 is first reflected upward on the reflecting mirror 36 in the cyan optical portion 20C, and then reflected rearward on the reflecting mirror 37. The laser beam LB2 is thereafter reflected in the diagonally rearward and downward direction on the reflecting mirror 38, passes through the toroidal lens 39, and is discharged from the cyan output window 21C.

The black optical portion 20K is provided with three reflecting mirrors 40, 41, 42 for reflecting the laser beam LB1, and a toroidal lens 43 for converging the laser beam LB1 reflected on the reflecting mirrors 40, 41, 42 in the auxiliary scanning direction. The reflecting mirror 40 as an optical member is provided at a position nearer the reflecting surface 17a of the polygon mirror 17 than the reflecting mirror 33 of the magenta optical portion 20M.

The laser beam LB1 passed through the fθ lens 19 is first reflected upward on the reflecting mirror 40 in the black optical portion 20K, then reflected rearward on the reflecting mirror 41, passes above the polygon mirror 17, reflected diagonally rearward and downward direction on the reflecting mirror 42, passes through the toroidal lens 43, and is then outputted from the black output window 21K.

In the yellow optical portion 20Y, magenta optical portion 20M, cyan optical portion 20C and black optical portion 20K, the arrangement of each reflecting mirror is determined so that lengths of the optical paths 44, 45, 46, 47 of the laser beams LB after reflection on the reflecting surface 17a of the polygon mirror 17 become equal.

<Constitution of the Processing Sections>

As shown in FIG. 1, the processing sections 13 are provided plurally correspondingly to the toners of a plurality of colors. Namely, the processing sections 13 include four parts, i.e. the yellow processing portion 13Y, magenta processing portion 13M, cyan processing portion 13C and black processing portion 13K. These processing portions 13 are arranged in the horizontal direction in a mutually spaced manner from the front side toward the rear side so that processing portions 13 are superposed horizontally in order in parallel with each other.

Each processing portion 13 is provided with the photosensitive drum 51 as a photosensitive body, scolotron type charger 52, and a developing cartridge 53 as a developing unit.

The photosensitive drum 51 is cylindrically formed, and provided with a drum body formed of a drum body made of a positively charged photosensitive layer, the outermost layer of which includes polycarbonate, and a drum shaft extending along an axis of the drum body. The drum body is provided rotatably with respect to the drum shaft, and the drum shaft is supported in the widthwise direction (the direction crossing the longitudinal direction and vertical direction, which is applicable in the following descriptions) of the processing portion unrotatably on both side walls. During an image formation operation, the photosensitive drum 51 is rotated in the same direction (clockwise in the drawing) in which the transfer belt 61 which will be described later is moved at a position in which the photosensitive drum 51 contacts the transfer belt 61.

The scolotron type charger 52 is provided with wires and grids, and is a positively charging type scolotron type charger adapted to generate corona discharge when charging bias is applied thereto. The scolotron type charger is disposed behind and opposing to the photosensitive drum with a distance thereto so as not to contact the photosensitive drum.

The developing cartridge 53 is provided in its casing with a developing roller 56, a feed roller 57 and a layer thickness restricting blade 58.

The developing roller 56 is disposed ahead and opposing to the photosensitive drum 51, and engaged under pressure therewith. This developing roller 56 is covered on the metal roller shaft thereof with a roller portion made of an elastic portion, such as a conductive rubber material. To be concrete, the roller portion is formed of a two-layer structure, which is made of conductive urethane rubber containing carbon particles, silicone rubber or EPDM rubber, and a coat layer formed on an outer surface of the roller layer and containing as main components urethane rubber, urethane resin, polyimide resin and the like. The roller shaft of the developing roller 56 is supported rotatably on the two widthwise side walls of the process portion 13, and developing bias is applied thereto during an image formation operation.

The feed roller 57 is placed in front of the developing roller 56, and is in an opposed to the developing roller 56 and is pressure engaged with the developing roller 56. This feed roller 57 is obtained by covering a metal roller shaft with a roller portion made of a conductive sponge member. The roller shaft of the feed roller 57 is supported rotably on two widthwise side walls of the processing section 13.

The layer thickness restricting plate 58 is made of a metal plate spring member, and provided at a free end portion thereof with a cross-sectionally semicircular pressure member made of an insulating silicone rubber. The layer thickness restriction blade 58 is supported in a position above the developing roller 56 on the case body of the developing cartridge 53, and a pressing member at a end portion (lower end portion) thereof is pressure engaged with the developing roller 56 from the front upper side thereof.

The upper portion of the casing of the developing cartridge 53 is formed as a toner storage chamber 55, in which the toners of various colors are stored. In the toner storage chamber 55 of the yellow processing portion 13Y, a polymerized toner of one positively charging non-magnetic component having a yellow color is stored. In the toner storage chamber 55 of the magenta processing portion 13M, a polymerized toner of one positively charging non-magnetic component having a magenta color is stored. In the toner storage chamber 55 of the cyan processing portion 13C, a polymerized toner of one positively charging non-magnetic component having a cyan color is stored. In the toner storage chamber 55 of the black processing portion 13K, a polymerized toner of one positively charging non-magnetic component having a black color is stored To be concrete, the toner of each color in use is a substantially spherical polymerized toner obtained by a polymerization method. The polymerized toner contains a bound resin obtained by copolymerizing by a known polymerization method, such as suspension polymerization and the like a styrene-based monomer, such as styrene, and an acryl-based monomer, such as acrylic acid, alkyl (C1 to C4) acrylate, alkyl (C1 to C4) methacrylate, as a main component; forming toner parent particles by mixing this bound resin with coloring agents, a charging control agent, wax and the like; and adding an outer additive to the resultant mixture so as to improve a fluidity thereof.

As the coloring agents, each of the coloring agents of the above-mentioned yellow, magenta, cyan and black are mixed. As the charging control agent, a charging control agent obtained by the copolymerization of an ionic monomer having an ionic functional group, such as ammonium salt and a monomer copolymerizable with an ionic monomer, such as a styrene-based monomer and an acryl-based monomer is mixed. As the outer additive, powder of metal oxide, for example, silica, aluminum oxide, titanium oxide, strontium titanate, cerium oxide, magnesium oxide, and inorganic powder, such as powder of carbide and powder of metal salt and the like are mixed.

In each processing portion, the toner of each color stored in each toner storage chamber 55 is supplied onto the fed roller 57 during the formation of an image, and, owing to the rotation of this fed roller, the toner is supplied to the developing roller 56. During this time, the toner is positively friction charged in practice between the feed roller 57 and developing roller 56 to which developing bias is applied. The toner supplied onto the developing roller 56 advances in accordance with, the rotation of the developing roller 56 into a clearance between the layer thickness restriction blade 58 and developing roller 56, and becomes a thin layer of a predetermined thickness, the resultant toner being supported on the developing roller 56.

The scolotron type charger 52 generates corona discharge owing to the application of charging bias thereto, and the surface of the photosensitive drum 51 is positively charged uniformly. After the surface of the photosensitive drum 51 is positively charged in uniform manner by the scolotron type charger 52 in accordance with the rotation of the photosensitive drum 51, the surface thereof is exposed with the high-speed scanning of the laser beam outputted from the output window 21 of the scanner unit 12, and an electrostatic latent image of a color corresponding to an image to be formed on the paper 3 is obtained.

When the photosensitive drum 51 is further rotated to cause the toner supported on the surface of the developing roller 56 and charged positively to be engaged with the photosensitive drum 51 opposing to the photosensitive drum 51 owing to the rotation of the developing roller 56, the toner is supplied to the electrostatic latent image formed on the surface of the photosensitive drum 51, i.e. the exposed portion exposed with the laser beam and having a lowered electric potential. The electrostatic latent image on the photosensitive drum 51 is thereby turned into a visible image, and a toner image based on a reversing phenomenon is supported correspondingly to each color.

<Constitution of the Transfer Section>

The transfer section 14 is provided in the portion of the body casing 2 which is above the paper cassette 7 and under the processing portion 13 in the longitudinal direction. This transfer section 14 includes a driving roller 59, a driven roller 60, a transfer belt 61, transfer rollers 62 and a belt cleaning section 63.

The driving roller 59 is provided on the rear lower side of the photosensitive drum 51 of the black processing portion 13K. This driving roller 59 is rotated in the direction (counter-clockwise in the drawing) opposite to the rotational direction of the photosensitive drum 51 during an image formation operation.

The driven roller 60 is provided on the front and lower side of the photosensitive drum 51 of the yellow processing portion 13Y so as to be opposed in the longitudinal direction to the driving roller 59. This driven roller 60 is driven rotated in the same direction as the direction (counter-clockwise) of the driving roller 59 during the rotation of the driving roller 59.

The transfer belt 61 is made of an endless belt, and formed out of a resin, such as conductive polycarbonate and polyimide in which conductive particles of carbon are dispersed. This transfer belt 61 is wound between the driving roller 59 and driven roller 60, and an outer contact surface of the wound belt is opposed to and contacts all photosensitive drums 51 of processing portions 13.

The driven roller 60 is driven by the driving operation of the driving roller 59, and the transfer belt 61 is moved between the driving roller 59 and driven roller 60 so as to rotate circularly at the contact surfaces thereof which is opposed to and contact the photosensitive drums 51 of the processing portions 13 in the same direction as the photosensitive drums 51 (counter-clockwise) as shown by arrows A.

The transfer rollers 62 are provided on the inner side of the transfer belt 61 wound between the driving roller 59 and driven roller 60 so as to be opposed to the photosensitive drums 51 of the processing portions 13 with respect to the transfer belt 61. Each transfer roller 62 is formed by covering the metal roller shaft with a roller portion made of an elastic material, such as a conductive rubber material. The roller shaft of the transfer roller extends laterally, and is rotatably supported, to which a transfer bias is applied during a transfer operation. Each transfer roller 62 is rotated at the contact surface thereof opposed to and engaged with the transfer belt 61 in the same direction (counter-clockwise in the drawing) as the direction in which the transfer belt 61 is circularly moved.

The paper 3 supplied from the paper feed section 4 is transferred from the front side to the rear side by the transfer belt 61, which is circularly moved by the driving operation of the driving roller 59 and the driven operation of the driven roller 60, in such a manner that the paper 3 passes in order the image formation positions between the transfer belt 61 and the photosensitive drums of the processing portions 13. During the transfer of the paper, toner images corresponding to the colors supported on the photosensitive drums 51 of the processing portions 13 are transferred in order, and color images are thereby formed on the paper 3.

For example, when the yellow toner image supported on the surface of the photosensitive drum 51 of the yellow processing portion 13Y is transferred onto the paper 3, the magenta toner image supported on the surface of the photosensitive drum 51 of the magenta processing portion 13M is transferred superposing to the paper 3 to which the yellow toner image was already transferred, and the cyan toner image supported on the surface of the photosensitive drum 51 of the cyan processing portion 13C and the black toner image supported on the surface of the photosensitive drum 51 of the black processing portion 13K are then transferred superposing to the paper 3 by the same operations. Color images are thereby formed on the paper 3.

In the formation of such color images, toner images corresponding to various colors are formed at substantially the same speed as the speed at which monochromatic images are formed since this color laser printer 1 is of a tandem type apparatus structure provided with a plurality of processing portions 13 corresponding to various colors. Therefore, the formation of the high-speed color images can be achieved. This enables forming the color images while attaining the downsizing of the apparatus.

The belt cleaning section 63 is provided below the transfer belt 61, and holds in an opposed state the black processing portion 13 and transfer belt.

This belt cleaning section 63 is provided with a primary cleaning roller 64 disposed so as to contact the outer surface of the transfer belt 61 and adapted to scrape off the paper powder and toner deposited on the outer surface of the transfer belt 61, a secondary cleaning roller 65 disposed so as to contact the primary cleaning roller 64 and adapted to electrically recover the paper powder and toner scraped off by the primary cleaning roller 64, a scraping blade 66 for contacting the secondary cleaning roller 65 and adapted to crape off the paper powder and toner recovered by the secondary cleaning roller 65, and a cleaning box 67 for storing the paper powder and toner scraped off by the scraping blade 66.

In this belt cleaning section, the paper powder and toner deposited on the outer surface of the transfer belt 61 are first scraped off by the primary cleaning roller 64, and the paper powder and toner scraped off by the primary cleaning roller 64 are thereafter electrically recovered by the secondary cleaning roller 65. After the paper powder and toner recovered by the secondary cleaning roller 65 are then scraped off by the scraping blade 66, and stored in the cleaning box 67.

<Constitution of the Fixing Section>

The fixing section 15 is provided at the back of the transfer section 14. This fixing section 15 is provided with a heating roller 68, a pressure roller 69 and transfer rollers 70. The heating roller 68 is made of a raw metal pipe on the surface of which a parting agent layer is formed, and provided therein with a halogen lamp extending in the axial direction thereof. The surface of the heating roller 68 is heated with the halogen lamp to a fixing temperature. The pressure roller 69 is provided so as to press the heating roller 68. The transfer rollers 70 are made of upper and lower rollers, and disposed at the back of the heating roller 68 and pressure roller 69.

The color images transferred onto the paper 3 are then transferred to the fixing section 15, and during the paper 3 passes between the heating roller 68 and pressure roller 69, the paper 3 is heated and pressed and thereby thermally fixed. The thermally fixed paper 3 is sent to a paper discharge section 6 by the transfer rollers 70.

<Constitution of the Paper Discharge Section>

The paper discharge section 6 includes a paper discharge path 71, a paper discharge rollers 72 and paper discharge tray 73.

The paper discharge path 71 is adjacent at an upstream end portion thereof in a lower position to the transfer rollers 70 so that the paper 3 is supplied in the rearward direction, and adjacent at a downstream end portion thereof in an upper position to the paper discharge rollers 72 to form the discharge path as a substantially U-shaped discharge path so that the paper 3 is discharged in the forward direction.

The paper discharge rollers 72 are provided as a pair of rollers on the downstream end portion of the paper discharge path 71.

The paper discharge tray 73 is formed on the upper side of the body casing as an inclined wall which inclines downward from the front side toward the rear side.

The paper 3 sent from the transfer rollers 70 is reversed with respect to the transfer direction thereof in the interior of the paper discharge path 71, and then discharged toward the front side by the paper discharge rollers 72. The discharged paper 3 is stacked on the paper discharge tray 73.

In the scanner unit 12 of this color laser printer 1 described above, the angle formed between the optical path 46 of the laser beam LB3 and optical path 47 of the laser beam LB4 immediately after the reflection on the reflecting surface 17a is $\alpha=2'$, and is larger than the angle formed between the optical path 46 of the laser beam LB3 and optical path 45 of the laser beam LB2 $\beta=1.5°$. The reflecting mirror 40 on the optical path 47 is disposed in a position closer to the reflecting surface 17a of the polygon mirror 17 than the reflecting mirror 33 on the optical path 45.

Since the angle a formed between the optical path 46 of the laser beam LB3 and optical path 47 of the laser beam LB4 is larger than the angle $\beta$ formed between the optical path 46 of the laser beam LB3 and optical path 45 of the laser beam LB2, a sufficient distance can be secured for the disposition of the reflecting mirror 40 on the optical path 47 in a position near the reflecting surface 17a of the polygon mirror 17 compared with the space between the optical path 46 and optical path 45. Between the optical path 46 and optical path 45, a sufficient distance can be secured for the disposition of the reflecting mirror 33 on the optical path 45 by moving away from the reflecting surface 17a of the polygon mirror 17. Therefore, when the reflecting mirror 33 on the optical path 45 is disposed in a relatively far position with respect to the reflecting surface 17a of the polygon mirror 17 with the reflecting mirror 40 on the optical path 47 disposed in a relatively near position, the interference of the reflecting mirror 40 with the laser beam LB3 passing through the optical path 46 can be prevented even though a little error occurs in the disposition of the reflecting mirror 40. Accordingly, the accuracy which the disposition of the reflecting mirror 40 requires can be lowered without increasing the dimensions of the scanner unit 12. As a result, the labor and time needed for the disposition of the reflecting mirror 40 and those needed for the manufacturing of the color laser printer 1 can be reduced.

On the reflecting surface 17a of the polygon mirror 17, a distance D1 between the incident position P4 of the laser beam LB4 and the incident position P3 of the laser beam LB3 is larger than a distance D2 between the incident position P3 of the laser beam LB3 and the incident position P2 of the laser beam LB2. Therefore, a sufficient distance between the optical path 46 of the laser beam LB3 and the optical path 47 of the laser beam LB4 can be secured. This enables a sufficient distance for the disposition of the reflecting mirror 40 on the optical path 47 to be secured between the optical path 46 and optical path 47. Accordingly, the accuracy needed to dispose the reflecting mirrors 40 can be further lowered, and the labor and time taken by the disposition of the reflecting mirror 40 can be further reduced.

The laser beams LB1, LB2 are inputted from the lower side of the reference plane F into the reflecting surface 17a, and the laser beams LB3, LB4 from the upper side of the reference plane F into the same. Therefore, margins can be left in the distances among the laser beams LB compared with constitution in which all laser beams LB are inputted from the same side of the reference plane F into the reflecting surface 17a. The degree of freedom of arrangement of the laser beam emitting members 24, collimator lenses 25, slit plates 26, reflecting mirrors 27, 28, 29 and cylindrical lens 30 provided in the laser beam emitting section 18 can be increased.

The laser beam LB1 downwardly most spaced from the reference plane F and the laser beam LB4 upwardly most spaced from the reference plane F are inputted into the reflecting surface so that the angle $\theta1$ of the laser beam LB1 formed with respect to the reference plane F is the same as the angle $\theta2$ of the laser beam LB4 formed with respect to the reference plane F. Therefore, these laser beams LB1, LB4 can be subjected to polarization and scan with the same accuracy by the polygon mirror 17. Further, since the laser beams LB1, LB4 reflected on the polygon mirror 17 enter the incident surface of the f$\theta$ lens 19 at the same angle, the fθ function in the fθ lens 19 can be displayed with the same accuracy with respect to the laser beams LB1, LB4. This enables the scanning accuracy of the photosensitive drum 51 by the laser beam LB1 and the scanning accuracy of the photosensitive drum 51 by the laser beam LB4 can be set equal.

The laser beam LB2 passing through the optical path 45, the laser beam LB3 passing through the optical path 46 and the laser beam LB4 passing through the optical path 47 are all reflected upward on the reflecting mirrors 33, 36, 40. Therefore, other reflecting mirrors and the like to be disposed on the optical paths 45, 46, 47 on which the laser beams were reflected can be disposed in a concentrated manner above the reflecting mirror 33, 36, 40. As a result, the scanner unit 12 can be downsized.

Four processing portions 13 are provided correspondingly to the four laser beams subjected to the polarization and scan by the polygon mirror 17. The independent laser beams are applied to the four photosensitive drums 51 provided in the respective processing portions 13, and electrostatic latent images are thereby formed. This enables electrostatic latent images to be formed on four photosensitive drums 51 in one scanner unit 12. As a result, the color laser printer 1 can be downsized compared with a structure in which a scanner unit is provided with respect to each photosensitive drum 51.

The four electrostatic latent images formed on four photosensitive drums are developed with developing agents corresponding to the colors of yellow, magenta, cyan and black by the four developing rollers 56 provided in the respective processing portions 13, and the developed images are then superposed in order on the same paper 3 in the transfer section 14. Therefore, in this color laser printer 1, it is possible to form high-accuracy electrostatic latent images on the respective photosensitive drums 51, and high-accuracy color images on the paper. Moreover, color images can be formed at substantially the same speed as monochromatic images.

Although this mode of illustrative example employs a structure using a polygon mirror 17 as a scanning unit, a galvano-mirror may be used instead of the polygon mirror 17.

Concerning the arrangement of the optical members, which constitutes one of the characteristics of the present illustrative example, the arrangement of reflecting mirrors 40 was described as an example. When slits for setting (preventing the occurrence of stray light) the cross-sectional shapes of the laser beams LB are provided on the optical paths 44, 45, 46, 47, the slit as an optical member on the optical path 45 is disposed in a relatively far position with respect to the reflecting surface 17 of the polygon mirror 17, and the slit as the optical member on the optical path 47 is disposed in a relatively near position. As a result, each slit can be prevented from interfering with the laser beam LB3 passing though the optical path 46 even though a little error occurs in the disposition of these slits.

What is claimed is:

1. An optical scanner comprising:
    a scanning unit having a reflecting surface that reflects a laser beam on the reflecting surface and scans the laser beam in a primary scanning direction;
    a laser beam radiation unit that radiates a plurality of laser beams to the reflecting surface from directions at predetermined angles to a reference plane respectively, the reference plane being orthogonal to the reflecting surface and extending along the primary scanning direction; and
    optical members respectively provided on optical paths of the plurality of laser beams after reflections on the reflecting surface, wherein
    the laser beam radiation unit radiates the plurality of laser beams to the reflecting surface, in such a manner that, among the optical paths of the plurality of laser beams after the reflections on the reflecting surface, an angle on a plane orthogonal to the reference plane between a first optical path and a second optical path is larger than an angle on the plane orthogonal to the reference plane between the first optical path and a third optical path, the second optical path being adjacent to one side of the first optical path, and the third optical path being adjacent to an other side of the first optical path, and
    the optical member on the second optical path is disposed in a position nearer the reflecting surface than the optical member on the third optical path.

2. The optical scanner according to claim 1, wherein
    the laser beam radiation unit radiates the plurality of laser beams to the reflecting surface, in such a manner that, the second laser beam is reflected at a position which is separated by a predetermined distance on the plane orthogonal to the reference plane toward one side with respect to a reflection position of a first laser beam on the reflecting surface, and a third laser beam is reflected at a position separated by a distance smaller than the predetermined distance on the plane orthogonal to the reference plane toward an other side with respect to the reflection position of the first laser beam, and
    the optical member on an optical path of the second laser beam is disposed in a position nearer the reflecting surface than the optical member on an optical path of the third laser beam.

3. The optical scanner according to claim 1, wherein
    the laser beam radiation unit radiates at least one laser beam to the reflecting surface from a side of the reference plane which is opposite to a side from which another laser beam is radiated to the reflecting surface.

4. The optical scanner according to claim 3, wherein
    the laser beam radiation unit radiates the plurality of laser beams to the reflecting surface, in such a manner that, an angle on the plane orthogonal to the reference plane between a laser beam separated the most toward one side with respect to the reference plane and the reference plane is the same as an angle on the plane orthogonal to the reference plane between a laser beam separated the most toward an other side with respect to the reference plane and the reference plane.

5. The optical scanner according to claim 1, wherein
    the optical member on the first optical path is a reflecting mirror that reflects the first optical path toward one side of the reference plane,
    the optical member on the second optical path is a reflecting mirror that reflects the second optical path toward one side of the reference plane, and
    the optical member on the third optical path is a reflecting mirror that reflects the third optical path toward one side of the reference plane.

6. An image forming apparatus comprising:
    an optical scanner comprising:
        a scanning unit having a reflecting surface that reflects a laser beam on the reflecting surface and scans the laser beam in a primary scanning direction;
        a laser beam radiation unit that radiates a plurality of laser beams to the reflecting surface from directions at predetermined angles to a reference plane respectively, the reference plane being orthogonal to the reflecting surface and extending along the primary scanning direction; and optical members respectively provided on optical paths of the plurality of laser beams after reflections on the reflecting surface, wherein the laser beam radiation unit radiates the plurality of laser beams to the reflecting surface, in such a manner that, among the optical paths of the plurality of laser beams after the reflections on the reflecting surface, an angle on a plane orthogonal to the reference plane between a first optical path and a second optical path is larger than an angle on the plane orthogonal to the reference plane between the first optical path and a third optical path, the second optical path being adjacent to one side of the first optical path, and the third optical path being adjacent to an other side of the first optical path, and the optical member on the second optical path is disposed in a position nearer the reflecting surface than the optical member on the third optical path;

a plurality of photosensitive bodies on which an electrostatic latent image is formed by scanning a laser beam by the optical scanner; and a plurality of developing units adapted to develop with a developing agent the electrostatic latent image formed on the photosensitive body.

7. The image forming apparatus according to claim 6, wherein the electrostatic latent images formed on the photosensitive bodies are developed with different colors of developing agents.

* * * * *